March 16, 1926.
S. C. GOULD
TOWLINE BUMPER
Filed Jan. 4, 1926
1,576,967
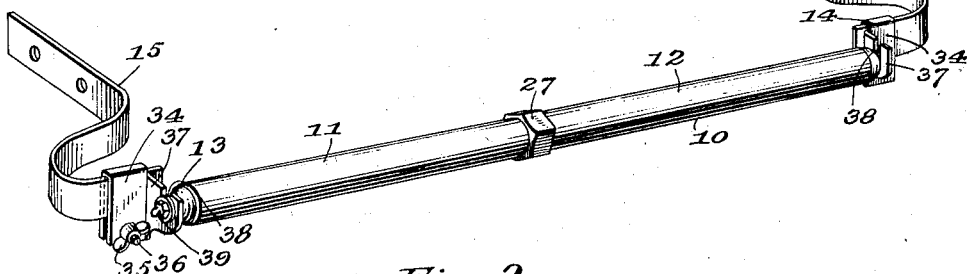
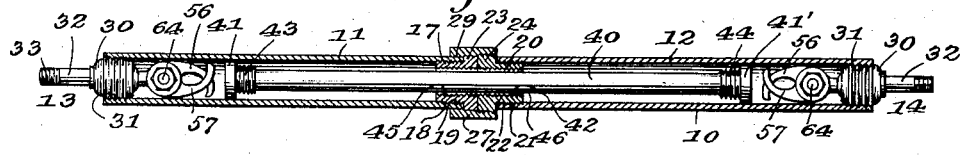
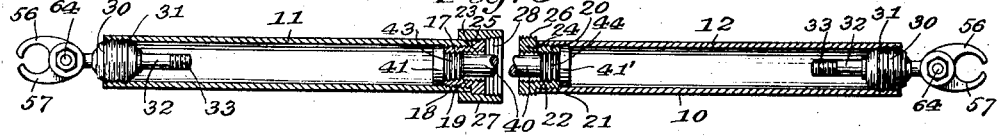
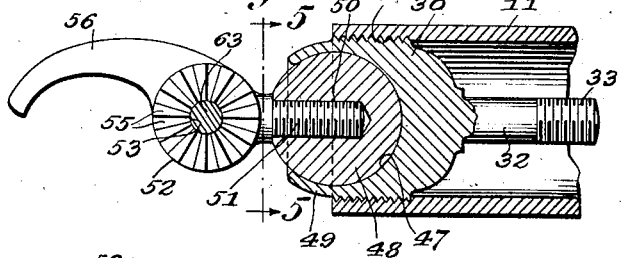
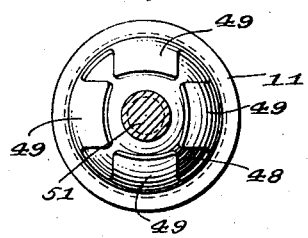
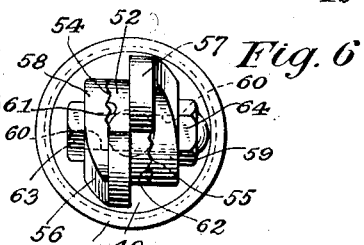
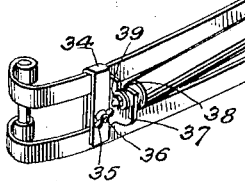
INVENTOR.
S. Charles Gould
BY
G. H. Braddock
ATTORNEY Patented Mar. 16, 1926.

1,576,967

UNITED STATES PATENT OFFICE.

SAMUEL CHARLES GOULD, OF BRIDGEPORT, CONNECTICUT.

TOWLINE BUMPER.

Application filed January 4, 1926. Serial No. 79,156.

*To all whom it may concern:*

Be it known that I, SAMUEL CHARLES GOULD, a citizen of the United States, and resident of Bridgeport, in the county of Fairfield and State of Connecticut, have invented certain new and useful Improvements in Towline Bumpers, of which the following is a specification.

This invention relates to a tow line bumper, and has more particular reference to a device which can be utilized in connection with a vehicle as an ordinary bumper, or as a push or pull tow line.

An object of the invention is to provide a bumper adapted to be put to use as a push or pull tow line when occasion requires.

A further object is to provide a bumper adapted to be extensible to be put to use as a push or pull tow line.

And a further object is to provide a novel push and pull tow line bumper which will be of simple and economic construction and an improvement generally over the device disclosed in my Patent No. 1,473,288, granted November 6, 1923.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and meant in no way in a limiting sense, changes in details of construction and arrangement of parts being permissible so long as within the spirit of the invention and the scope of the appended claims.

In the accompanying drawing forming a part of this specification,

Fig. 1 is a perspective view of the device as applied to use as an ordinary bumper;

Fig. 2 is a longitudinal sectional view of the device of Fig. 1, removed from a vehicle;

Fig. 3 is a longitudinal sectional view of the device of Fig. 1, removed from a vehicle and arranged to be used as a push or pull tow line, a part of the extension rod being broken away;

Fig. 4 is an enlarged fragmentary sectional view detailing one end of the device as disclosed in Fig. 3;

Fig. 5 is a sectional view on line 5—5 in Fig. 4;

Fig. 6 is an end view as seen from the left in Fig. 4; and

Fig. 7 is a perspective view of the device associated with an ordinary bumper of different construction.

With respect to the drawing, 10 represents a bumper of ordinary or preferred construction. As disclosed, the bumper consists of a pair of aligning tubes, denoted 11 and 12, detachably joined end to end, and bumper supporting means, indicated generally at 13 and 14, at the ends of the tubes adapted to be removably and adjustably secured to brackets 15 and 16 themselves carried by the opposite side members of an automotive vehicle frame (not shown).

The tubes 11 and 12 are, as disclosed, joined together in the manner now to be explained. Numeral 17 denotes a coupling element having an external thread 18 adapted to engage an internal thread 19 at the inner end of the tube 11, and 20 is a somewhat similar coupling element having an external thread 21 adapted to engage an internal thread 22 at the inner end of the tube 12. The coupling element 17 has an annular flange 23 adapted to engage the inner end of the tube 11 when said coupling element is threaded into said tube, and the coupling element 20 has a similar annular flange 24 adapted to similarly engage the inner end of the tube 12 when said coupling element is threaded into said tube 12. The tubes 11 and 12 are of equal diameter, and the flanges 23 and 24 are also of equal diameter, greater than the diameter of said tubes. The circumference 25 of the annular flange 23 is smooth, while the circumference 26 of the annular flange 24 is threaded. Numeral 27 denotes a coupling nut slidable upon the tube 11 and having an internal thread 28 adapted to engage the thread 26 of the annular flange 24, 29 representing an internal flange of the nut 27 adapted to engage the annular flange 23 when the thread 28 is turned home upon the thread 26. Clearly, when the coupling elements 17 and 20 are screwed their total distances into the tubes 11 and 12, respectively, and the coupling nut is turned upon the thread 26 to force the adjacent faces of the coupling elements into engagement, the tubes 11 and 12 are securely, but detachably, locked together.

The bumper supporting means 13 and 14 may be duplicates. Each may consist of an externally threaded member 30 adapted to engage internal threads 31 at the outer ends of the tubes 11 and 12, respectively, and a shank 32 upon said member having threads 33 upon its end portion.

The manner of removably and adjustably securing the bumper to the brackets 15 and 16 is best disclosed in Fig. 1, wherein 34 indicates small clip brackets adapted to be slid from and toward each other upon the brackets 15 and 16, and each adapted to be clamped at any desired position upon said brackets 15 and 16 as by a wing nut 35 upon a small bolt 36 secured to one arm of a clip bracket and passing through the other arm thereof. Right-angle extensions 37 of the clip brackets 34 have notches 38 in their upper surfaces adapted to receive the shanks 32 of the bumper supporting means, and nuts 39 of ordinary or preferred design are adapted to be turned upon the threads 33 of the shanks to secure the extensions 37 between said nuts and the outer ends of the members 30.

The bumper as described is adapted to be extensible to be put to use as a push or pull tow line. To this end, the detachably connected tubes 11 and 12 carry an extension rod 40 whereby the bumper can be extensible, and the bumper supporting means carry mechanism for properly securing the extended bumper to a towing and towed vehicle, all as to be now described.

The extension rod 40 may include heads 41, 41' at its opposite ends, one of which heads could be removable, adapted to nicely fit and slide in the tubes 11 and 12, there being one head in each tube as disclosed in Fig. 2 and the body of the extension rod passing freely through the coupling elements as indicated at 42. Adjacent each head the extension rod may have threads, indicated 43 and 44, respectively, adapted to engage internal threads 45 and 46 of the coupling elements 17 and 20, respectively. The arrangement is such that when the tubes 11 and 12 are disconnected in an obvious manner and the threads 43 and 44 are turned into the threads 45 and 46, the heads 41 and 41' engage the coupling elements in the manner best disclosed in Fig. 3. At this time, clearly, the device will have considerable length, being longer than the bumper when in use an amount slightly less than the length of the extension rod 40, and the extended device will be rigid for service as a push or as a pull tow line.

Each member 30 has a spherical recess 47 opposite its shank 32, and rotatably held in the recess is a ball 48 adapted to provide a universal joint. The member 30 may be of any suitable material, and the position of the ball 48 in the recess 47 may be insured in any suitable manner allowing universal movement of the ball, as by utilization of lugs 49 integral with the member 30 and engaging the ball. The ball may be inserted in the recess 47, and the lugs 49 may afterwards be shaped to fit about the ball. Any equivalent arrangement may be substituted.

The ball 48 has a threaded opening 50 to receive a threaded shank 51 of an eye bolt 52 having transverse opening 53, and also having opposite preferably parallel faces provided with radial teeth, denoted 54 and 55, respectively. The eye bolt is preferably quite close to the ball 48, as disclosed. Numerals 56 and 57 indicate gripping jaws adapted to be secured to some convenient part of a vehicle, one set of jaws to a towing and the other set to a towed vehicle, each jaw including a preferably circular disc, indicated 58 and 59, respectively, at its inner end, the discs each having an opening 60 with radial teeth, denoted 61 and 62, respectively, adapted to engage the teeth 54 and 55 of the eye bolt 52. A small bolt 63 passing through the openings 53 and 60 receives a nut 64, the bolt and nut together being adapted to clamp the jaws to the eye bolt. Evidently, the jaws 56 and 57 can be fitted about a part of a vehicle, and then locked to the eye bolt in an obvious manner.

In Fig. 2 the novel device is shown with parts positioned for use as a bumper. To set it up for use, the protruding shanks are merely supported upon a vehicle, as for example in the manner disclosed in Fig. 1. In Fig. 3 the device is shown with parts positioned for use as a tow line. To thus set it up for use, one protruding gripping jaw is secured to a part of a towing vehicle and the other protruding gripping jaw is secured to a part of a towed vehicle. In the case of Fig. 3 the bumper supporting shanks are within the tubes, while in the case of Fig. 2 the gripping jaws are within the tubes.

In Fig. 7 I have disclosed an ordinary or preferred form of bumper A with a device 10' having the features of the invention carried thereon by means of clip brackets in about the fashion the clip brackets of Fig. 1 support the bumper. Or a device such as disclosed in Fig. 2 (say, for example, of smaller size) can be installed as a part of a tool box equipment for use as a tow line when occasion requires.

Having thus fully described the invention, what I claim as new and desire to secure by Letters Patent is:

1. A device of the character described, comprising a plurality of tubes detachably secured end to end, means for removably supporting said tubes from a vehicle, and mechanism whereby an end of each tube can be secured to a towing or a towed vehicle.

2. A device of the character described, comprising a plurality of tubes adapted to be detachably secured end to end, an extension member in said tubes and adapted to be secured to an end of each tube, and mechanism whereby an end of each tube can be secured to a towing or a towed vehicle.

3. A device of the character described, comprising a plurality of tubes adapted to be detachably secured end to end, an extension member in said tubes and adapted to be secured to an end of each tube, mechanism whereby an end of each tube can be secured to a towing or a towed vehicle, and means for removably supporting said tubes from a vehicle.

4. A device of the character described, comprising a plurality of tubes adapted to be detachably secured end to end, an extension member in said tubes and adapted to have each of its ends secured to said tubes, and mechanism whereby an end of each tube can be secured to a towing or a towed vehicle.

5. A device of the character described, comprising a plurality of tubes adapted to be detachably secured end to end, an extension member in said tubes and adapted to have each of its ends secured to said tubes, mechanism whereby an end of each tube can be secured to a towing or a towed vehicle, and means for removably supporting said tubes from a vehicle whereby the device can serve as a bumper.

6. The combination as specified in claim 2, wherein the mechanism includes a gripping jaw and a universal joint.

7. A device of the character described, comprising a bumper including telescoping parts, means whereby said bumper is extensible, and means whereby the bumper when extended can serve as a push and pull tow line.

8. A device of the character described, comprising a bumper including telescoping parts, means for removably securing said bumper to a vehicle, means whereby said bumper is extensible, and means whereby the bumper when extended can serve as a push and pull tow line.

9. A device of the character described, comprising a bumper including relatively slidable parts rendering the bumper adjustable as to length, and means adapting the bumper to be used as a tow line.

10. A device of the character described, comprising a bumper including relatively slidable parts rendering the bumper adjustable as to length, and means adapting the bumper when extended to be used as a push and pull tow line.

11. A device of the character described, comprising a bumper including detachably connected tubes, means rendering the bumper adjustable as to length when said tubes are disconnected, and means adapting the bumper when extended to be used as a push and pull tow line.

Signed at Bridgeport, in the county of Fairfield, and State of Connecticut, this 2nd day of January, A. D., 1926.

S. CHARLES GOULD.